(12) United States Patent
Neumeister

(10) Patent No.: US 9,046,166 B2
(45) Date of Patent: Jun. 2, 2015

(54) TRANSFER GEARBOX

(75) Inventor: Robert Neumeister, Bendorf (AT)

(73) Assignee: MAGNA Powertrain AG, Lannach (AT)

( * ) Notice: Subject to any disclaimer, the term of this patent is extended or adjusted under 35 U.S.C. 154(b) by 210 days.

(21) Appl. No.: 13/825,603

(22) PCT Filed: Aug. 29, 2011

(86) PCT No.: PCT/EP2011/004333
§ 371 (c)(1),
(2), (4) Date: Mar. 22, 2013

(87) PCT Pub. No.: WO2012/038022
PCT Pub. Date: Mar. 29, 2012

(65) Prior Publication Data
US 2013/0190114 A1    Jul. 25, 2013

(30) Foreign Application Priority Data
Sep. 22, 2010 (DE) .......................... 10 2010 046 262

(51) Int. Cl.
| | |
|---|---|
| *F16N 7/16* | (2006.01) |
| *F16N 7/24* | (2006.01) |
| *F16N 13/22* | (2006.01) |
| *F16H 57/04* | (2010.01) |
| *F01M 1/00* | (2006.01) |
| *F01M 9/06* | (2006.01) |
| *F16N 7/26* | (2006.01) |
| *F16N 7/28* | (2006.01) |
| *F01M 11/02* | (2006.01) |

(Continued)

(52) U.S. Cl.
CPC .......... *F16H 57/0434* (2013.01); *B60K 17/344* (2013.01); *F16H 57/0409* (2013.01); *F16H 57/045* (2013.01); *F16H 57/0483* (2013.01); *F16H 57/05* (2013.01)

(58) Field of Classification Search
CPC .......... B65G 45/08; F16H 57/05; D07B 7/12; B27B 17/12; B62J 31/00
USPC ..................... 184/6.12, 11.5, 11.1, 11.2, 15.1
See application file for complete search history.

(56) References Cited

U.S. PATENT DOCUMENTS

| | | | | |
|---|---|---|---|---|
| 606,543 | A | * | 6/1898 | Hanna .......................... 184/11.1 |
| 1,161,724 | A | * | 11/1915 | Pierce .......................... 184/11.1 |

(Continued)

FOREIGN PATENT DOCUMENTS

| | | |
|---|---|---|
| DE | 20 2006 022573 A1 | 12/2006 |
| DE | 10 2007 057984 A1 | 6/2009 |
| GB | 806 462 A | 12/1958 |

*Primary Examiner* — Henry Liu
(74) *Attorney, Agent, or Firm* — Jordan IP Law, LLC; Todd A. Vaughn

(57) ABSTRACT

A transfer gearbox includes an input shaft, first and second output shafts, and a torque transmission device having a clutch which distributes a driving torque introduced via the input shaft optionally to the first output shaft and the second output shaft. A chain drive is active between the torque transmission device and the second output shaft, and includes a lower chain wheel which engages in an oil sump with lubrication oil such that, by way of a chain, lubrication oil is conveyed from the oil sump in the direction of an upper chain wheel which is drive-connected to the lower chain wheel via the chain. The chain is arranged at an outlet opening of an oil reservoir which collects the lubrication oil and which opens into the oil sump. The chain throttles the flowing out of the lubrication oil collected in the oil reservoir into the oil sump.

20 Claims, 2 Drawing Sheets

(51) Int. Cl.
*F16H 57/05* (2006.01)
*B60K 17/344* (2006.01)

(56) References Cited

U.S. PATENT DOCUMENTS

| | | | | |
|---|---|---|---|---|
| 1,418,892 A * | 6/1922 | Weiss et al. | | 184/15.1 |
| 1,483,830 A * | 2/1924 | Moore | | 184/11.1 |
| 1,682,829 A * | 9/1928 | Bremer | | 184/15.1 |
| 1,717,365 A * | 6/1929 | Bremer | | 184/15.1 |
| 1,771,346 A * | 7/1930 | Perry | | 184/15.1 |
| 1,771,835 A * | 7/1930 | Bartlett | | 184/15.1 |
| 1,783,978 A * | 12/1930 | Perry | | 184/15.1 |
| 1,868,198 A * | 7/1932 | Dow | | 184/15.1 |
| 1,960,693 A * | 5/1934 | Bryant | | 184/15.1 |
| 1,984,148 A * | 12/1934 | Morrish et al. | | 184/15.1 |
| 2,560,233 A * | 7/1951 | Maier | | 184/6.12 |
| 2,620,897 A * | 12/1952 | Simpkin | | 184/15.1 |
| 3,012,632 A * | 12/1961 | Bradley | | 184/15.1 |
| 3,724,598 A * | 4/1973 | Smith | | 184/6.1 |
| 4,272,997 A * | 6/1981 | Groth | | 74/89.22 |
| 4,693,133 A * | 9/1987 | Tomita et al. | | 74/467 |
| 5,041,062 A * | 8/1991 | Dornhoff | | 474/144 |
| 5,273,136 A * | 12/1993 | Martin et al. | | 184/6.12 |
| 5,984,821 A * | 11/1999 | Showalter | | 475/204 |
| 6,101,897 A * | 8/2000 | Showalter | | 74/665 GE |
| 6,405,822 B1 * | 6/2002 | Lee | | 180/251 |
| 7,686,137 B2 * | 3/2010 | Tominaga et al. | | 184/6.12 |
| 7,766,126 B2 * | 8/2010 | Berger et al. | | 184/6.12 |
| 8,701,837 B2 * | 4/2014 | Yamamoto et al. | | 184/11.1 |
| 2006/0065487 A1* | 3/2006 | Tominaga et al. | | 184/6.12 |
| 2008/0026893 A1* | 1/2008 | Yamamoto et al. | | 474/91 |

* cited by examiner

TRANSFER GEARBOX

CROSS-REFERENCE TO RELATED APPLICATIONS

The present application is a National Stage Application of PCT International Application No. PCT/EP2011/004333 (filed on Aug. 29, 2011), under 35 U.S.C. §371, which claims priority to German Patent Application No. DE 10 2010 046 262.4 (filed on Sep. 22, 2010), which are each hereby incorporated by reference in their respective entireties.

TECHNICAL FIELD

Embodiments of the invention relate to a transfer gearbox which serves the purpose of variable distribution of the driving torque of a motor vehicle to the two vehicle axles. For this purpose, the transfer gearbox has an input shaft, a first output shaft and a second output shaft. The input shaft is drive-connected to a drive unit of the motor vehicle, for example, an internal combustion engine. The first output shaft is drive-connected to a first axle of the motor vehicle, for example, the rear axle, in particular via a first axle differential. The second output shaft is drive-connected to a second axle of the motor vehicle, for example, the front axle, in particular via a second axle differential.

The transfer gearbox furthermore has a torque transmission device which has a clutch in order to distribute a driving torque introduced via the input shaft optionally to the first output shaft and the second output shaft. For example, the first output shaft can be formed in one piece with or connected in a rotationally conjoint manner to the input shaft, wherein a friction clutch variably couples the input shaft optionally also to the second output shaft. Alternatively, it is, for example, possible that the torque transmission device comprises an intermediate axle differential gearbox, wherein a friction clutch is active between the input shaft and one of the two output shafts (or between the two output shafts) in order to optionally variably lock the intermediate axle differential gearbox.

The input shaft and the second output shaft are normally arranged at different heights, wherein an offset drive is provided between the torque transmission device and the second output shaft. This offset drive can be formed as a chain drive which has a lower chain wheel and an upper chain wheel which are drive-connected via a chain. The lower chain wheel is coupled in a rotationally conjoint manner to the second output shaft. The upper chain wheel is coupled in a rotationally conjoint manner to an output element of the torque transmission device.

So that a separate oil pump is not required for the transfer gearbox, the chain of the chain drive can serve as an oil conveyance device. To this end, the lower chain wheel engages in an oil sump with is filled with lubrication oil, wherein lubrication oil is conveyed by means of the chain out of the oil sump in the direction of the upper chain wheel. At the upper end of the chain drive, the lubrication oil is spun off from the chain and can then, for example, be caught by a collecting device and conducted from there in the direction of the lubrication points (e.g. friction clutch and bearing).

BACKGROUND

DE 10 2007 057 984 A1 discloses such a transfer gearbox in which an oil reservoir is provided for collecting the lubrication oil conveyed by means of the chain. The oil spun off from the chain is accommodated in the oil reservoir and conducted from there via a metering device to a friction clutch. After performing the lubrication and cooling function, the lubrication oil flows from the friction clutch back into the oil sump.

One disadvantage of known transfer gearboxes lies in the fact that the lower chain wheel which engages in the oil sump and the chain guided through the oil sump bring about undesirable churning losses, i.e. as a result of drag torques which occur in the oil sump, the efficiency of the transfer gearbox is reduced. Moreover, as a result of this, the temperature of the lubrication oil located in the oil sump is increased so that the cooling action of the lubrication oil is reduced.

SUMMARY

One object of the invention is to create a transfer gearbox in which lower churning losses occur in the oil sump.

This object is achieved by a transfer gearbox, with an input shaft, a first output shaft and a second output shaft, and with a torque transmission device which has a clutch in order to distribute a driving torque introduced via the input shaft optionally to the first output shaft and the second output shaft, wherein a chain drive is active between the torque transmission device and the second output shaft, which chain drive has a lower chain wheel and an upper chain wheel which are drive-connected via a chain, wherein the lower chain wheel engages in an oil sump with lubrication oil, wherein, by means of the chain, lubrication oil can be conveyed from the oil sump in the direction of the upper chain wheel, wherein an oil reservoir is provided to collect the lubrication oil, wherein the oil reservoir has an outlet opening which opens into the oil sump, wherein the chain is arranged at the outlet opening of the oil reservoir in such a manner that the chain throttles the flowing out of the lubrication oil collected in the oil reservoir into the oil sump.

In the case of the transfer gearbox in accordance with the invention, an oil reservoir serves to collect the lubrication oil once the lubrication oil has been conveyed to the torque transmission device in order to perform the intended lubrication and cooling function, and once the lubrication oil has flowed back from the torque transmission device. The oil reservoir comprises an outlet opening which opens into the oil sump which is typically located in the lowermost part of the transfer gearbox or of the gearbox housing. The chain of the chain drive is arranged immediately adjacent to and flush with the outlet opening of the oil reservoir in such a manner that the chain throttles the flowing out of the lubrication oil out of the oil reservoir into the oil sump, i.e. the chain serves as a locking device to ensure that a certain quantity of lubrication oil remains in the oil reservoir. A significant part of the quantity of lubrication oil thus remains stored in the oil reservoir during operation of the transfer gearbox so that this part of the lubrication oil does not bring about an increased oil level in the oil sump. In particular, the chain can be arranged and guided at the outlet opening of the oil reservoir in such a manner that the flow-out rate of the lubrication oil depends on the speed of movement of the chain.

One advantage of the transfer gearbox lies in the fact that, during operation of the transfer gearbox, only a small amount of the lubrication oil reaches the oil sump such that only low churning losses occur in the oil sump. Since, during operation of the transfer gearbox, only a low oil level arises, the housing of the transfer gearbox can have an advantageously flat structure. In the case of a standstill of the transfer gearbox, however, the full volume of the oil sump can be available for accommodating the lubrication oil once this has flowed out of the oil reservoir past the chain. As a result of this, high conveyance rates are achieved when starting up the transfer gearbox in order to be able to convey the lubrication oil quickly to the intended lubrication points and the comparatively high churning losses which occur during starting up of the transfer gearbox contribute to the lubrication oil heating up quickly in order to reach the operating temperature and achieve the viscosity intended in this case.

Advantageous embodiments of the invention are cited in the subordinate claims and described below.

The chain of the chain drive is preferably arranged at the outlet opening of the oil reservoir in such a manner that the chain conveys at least a part of the lubrication oil, which flows out of the oil reservoir, directly in the direction of the upper chain wheel, i.e. without this part of the flowing out lubrication oil reaching the oil sump at all. In other words, the chain is guided immediately adjacent to and flush with the outlet opening of the oil reservoir in such a manner that a part of the lubrication oil flowing out of the oil reservoir is carried along by the chain before this part of the lubrication oil flows down into the oil sump at the height of the oil level. This part of the quantity of lubrication oil flowing out therefore does not contribute to the churning losses which occur in the oil sump as a result of the constant immersion of the teeth of the lower chain wheel and the chain links.

It is furthermore preferred if the chain is guided above the outlet opening of the oil reservoir by a chain conduit. Such a chain conduit contributes to a particularly high conveyance rate of the oil conveyance device formed by the chain drive.

In accordance with one advantageous embodiment, the chain is also guided below the outlet opening of the oil reservoir by a chain conduit. In other words, the outlet opening of the oil reservoir opens into a chain conduit which opens downwards into the oil sump and continues above the outlet opening of the oil reservoir up until the upper chain wheel. It is achieved as a result of this that a particularly large part of the quantity of lubrication oil flowing out of the oil reservoir is conveyed by the chain directly in the direction of the upper chain wheel, while only a small part of the flowing-out quantity of lubrication oil reaches the oil sump counter to the direction of movement of the chain downwards.

It is furthermore preferred if the outlet opening of the oil reservoir is arranged above the bottom of the oil sump. An oil level can thus be set during operation of the transfer gearbox (i.e. while the chain is driven) within the oil sump, which oil level is comparatively low and lies below the outlet opening of the oil reservoir. The quantity of lubrication oil conveyed by the chain must namely only be partially removed from the oil sump, while a significant part of the conveyed lubrication oil can be removed via the outlet opening directly from the oil reservoir. The higher oil level in the oil reservoir during operation of the transfer gearbox (relative to the oil level in the oil sump) does not have a disadvantageous effect since none of the moving parts engage in the oil reservoir and bring about churning losses there.

The oil reservoir is preferably arranged radially offset to the oil sump relative to the rotational axis of the lower chain wheel. In particular, the oil reservoir can be arranged at least partially within the plane of movement of the chain, but outside the path of movement of the chain. As a result of this, the transfer gearbox can have a comparatively small height, wherein the required quantity of lubrication oil can nevertheless be accommodated in the housing of the transfer gearbox.

The transfer gearbox can have at least one return device to return the lubrication oil conveyed by means of the chain directly or indirectly to the torque transmission device back into the oil reservoir. The stated return device can, for example, comprise at least one groove formed integrally in the housing of the transfer gearbox. Alternatively or additionally, the stated return device can comprise at least one return line formed separately from the transmission housing.

In accordance with one advantageous embodiment, substantially all the lubrication oil conveyed by means of the chain to the torque transmission device is guided back into the oil reservoir, i.e. the conveyed lubrication oil can reach the oil sump substantially exclusively via the oil reservoir. As a result of this, oil levels of different heights can particularly effectively be set in the oil reservoir and the oil sump in order to minimize churning losses in the oil sump.

DRAWINGS

Embodiments of the invention are explained further below merely by way of example with reference to the drawings.

DESCRIPTION

Figure 1:
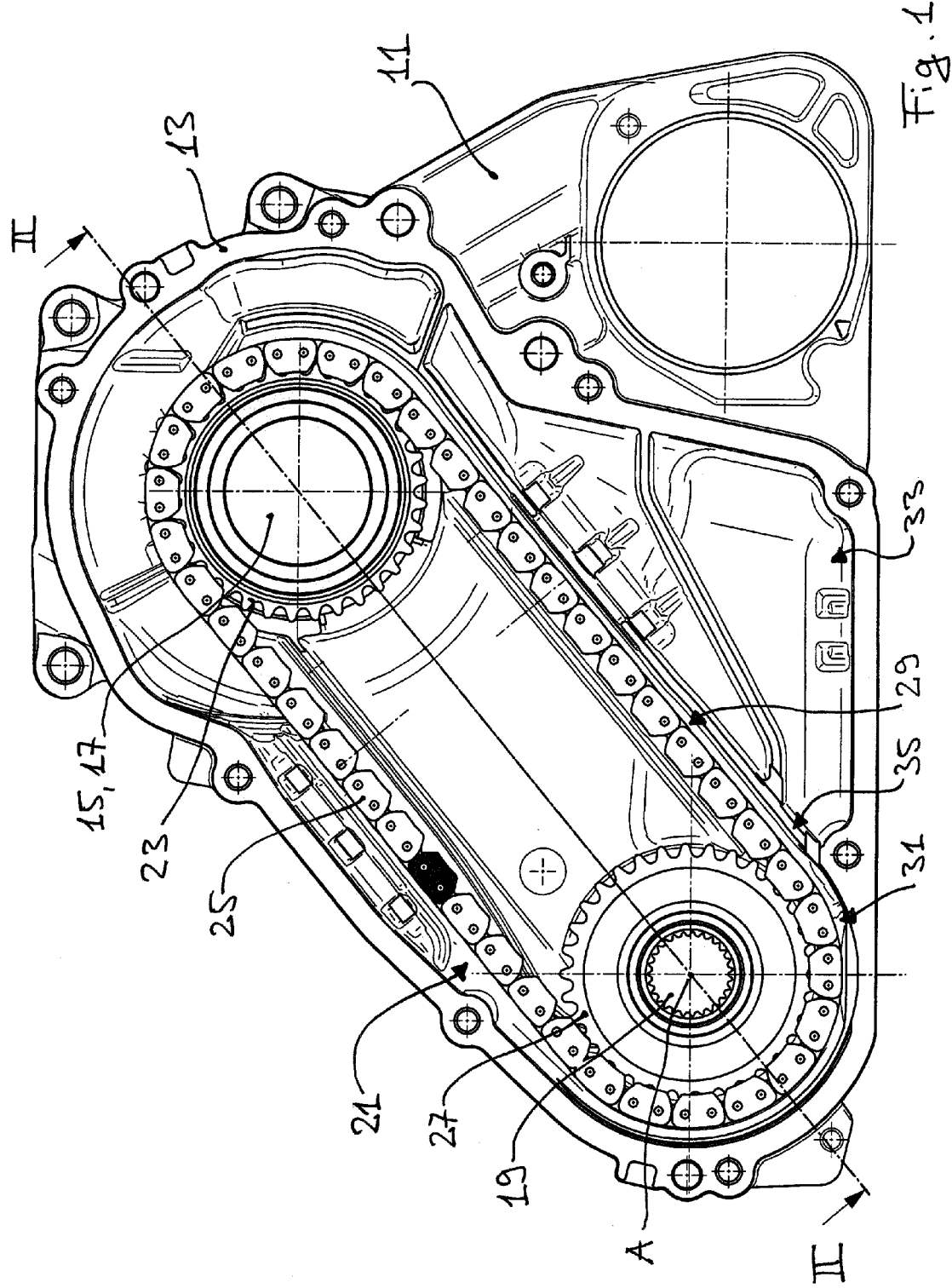
FIG. 1 illustrates a cross-sectional view of a transfer gearbox.
Figure 2:
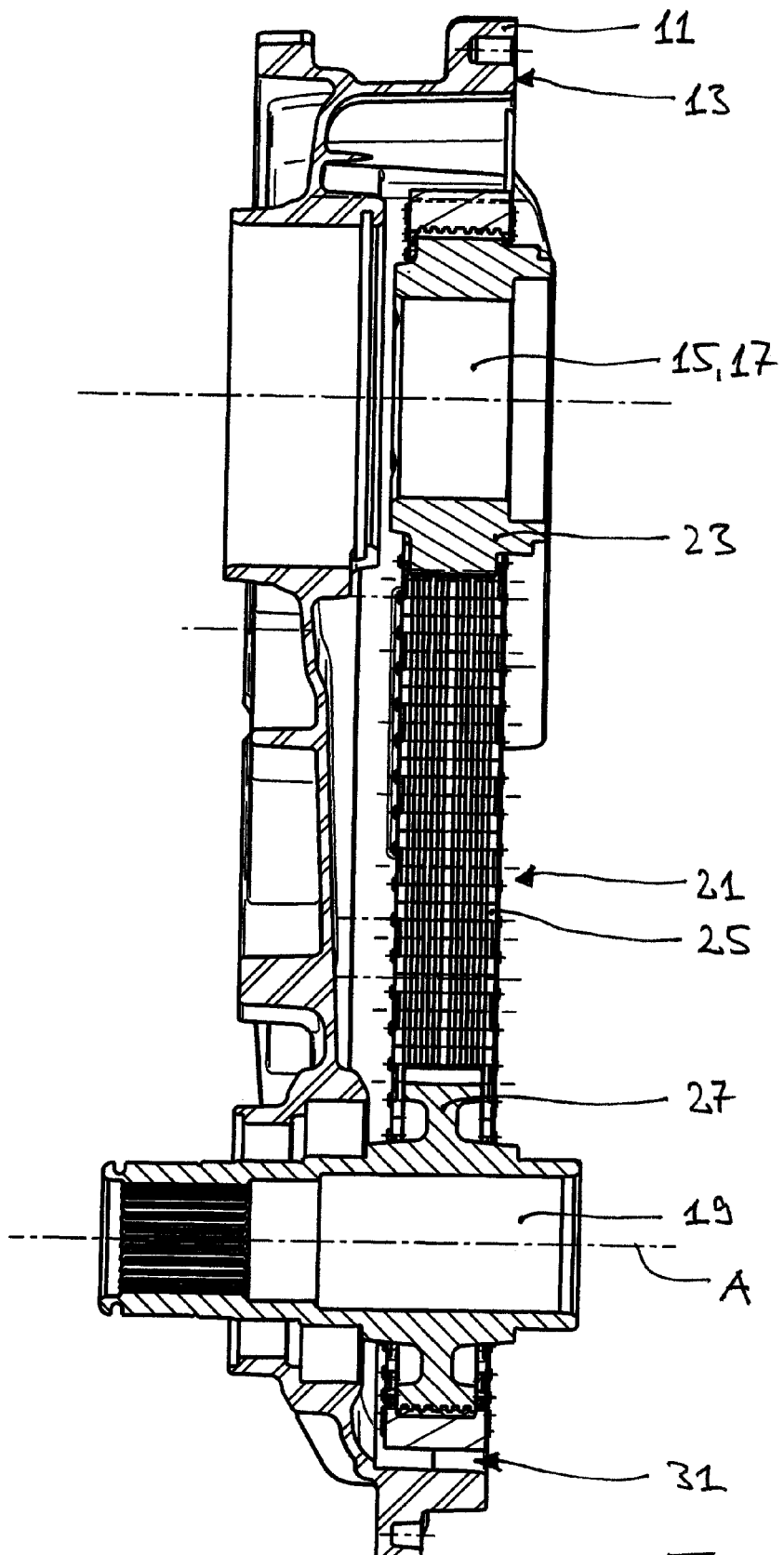
FIG. 2 illustrates a longitudinal sectional view along the plane II-II of FIG. 1.

The transfer gearbox illustrated in FIGS. 1 and 2 has a two-part housing of which only one half 11 is illustrated. Housing half 11 has a flange surface 13, against which in the assembled state an assigned flange surface of the other housing half rests (not illustrated). An input shaft 15 is rotatably mounted in the housing by means of rolling bearings (not illustrated), which input shaft 15 is formed in one piece with a first output shaft 17. Moreover, a second output shaft 19 is rotatably mounted in the housing offset parallel to input shaft 15, and indeed below input shaft 15. Input shaft 15 is drive-connected to a drive unit of a motor vehicle, for example, to the output element of a main gearbox which is assigned to an internal combustion engine. First output shaft 17 is drive-connected, for example, to an axle differential of the rear axle of the motor vehicle, while second output shaft 19 is drive-connected to an axle differential of the front axle of the motor vehicle. A part of the driving torque introduced via input shaft 15 can optionally be transmitted to second output shaft 19 and thus to the front axle of the motor vehicle by means of a friction clutch (not illustrated), in a familiar manner.

To this end, a chain drive 21 is active between the friction clutch and the second output shaft, wherein a first part of the friction clutch is connected in a rotationally conjoint manner to input shaft 15 and a second part of the friction clutch is connected in a rotationally conjoint manner to an upper chain wheel 23 of chain drive 21. Upper chain wheel 23 is drive-connected via a chain 25 to a lower chain wheel 27. Lower chain wheel 27 is connected in a rotationally conjoint manner to second output shaft 19. The chain strand which moves from lower chain wheel 27 in the direction of upper chain wheel 23 is guided along a chain conduit 29.

Lower chain wheel 27 and the portion of chain 25 resting on lower chain wheel 27 engage in an oil sump 31 which is formed in the lowermost region of housing half 11 and is filled with a part of the lubrication oil which serves to lubricate and/or cool components of the transfer gearbox, in particular, to lubricate and cool the discs of the stated friction clutch. During operation of the transfer gearbox, the lubrication oil located in oil sump 31 can be carried by chain 25 along chain conduit 29 in the direction of upper chain wheel 23. In the region of upper chain wheel 23, the carried lubrication oil can, for example, be spun off or stripped off, wherein the lubrication oil is then supplied via a suitable supply device, for example, via a groove, to the stated friction clutch and possibly to further lubrication points (e.g., bearings).

In addition to oil sump 31, an oil reservoir 33 is formed in housing half 11 illustrated. Oil reservoir 33 serves to collect lubrication oil which is conducted after the intended lubrication and cooling of the stated friction clutch (and possibly the bearings) via a suitable return device (e.g., groove or line) fully or largely into oil reservoir 33. Oil reservoir 33 is arranged radially offset to oil sump 31 in relation to rotational axis A of lower chain wheel 27, i.e., oil reservoir 33 is located behind oil sump 31 in relation to the longitudinal sectional view of FIG. 2.

Oil reservoir 33 has an outlet opening 35 which opens into oil sump 31. Chain 25 is arranged directly adjacent to and flush with outlet opening 35 in such a manner that chain 25 throttles the flowing out of the lubrication oil collected in oil reservoir 33 into oil sump 31, i.e. chain 25 serves as a locking element in terms of the flowing-out lubrication oil. Depending on the speed of movement of chain 25, a predominant part of the lubrication oil flowing out of oil reservoir 33 is conveyed by means of chain 25 along chain conduit 29 directly in the direction of upper chain wheel 23, i.e. this part of the flowing-out lubrication oil does not reach oil sump 31 in the first place.

As is apparent in the cross-sectional view of FIG. 1, outlet opening 35 of oil reservoir 33 interrupts chain conduit 29 formed in housing half 11, wherein, during operation of the transfer gearbox, the chain strand which moves in the direction of upper chain wheel 23 moves past outlet opening 35. Outlet opening 35 of oil reservoir 33 lies in this case directly opposite the outer circumferential side of chain 25. Outlet opening 35 of oil reservoir 33 is located in the installation position of the transfer gearbox above the lowest point of oil sump 31.

During operation of the transfer gearbox, the majority of the lubrication oil flowing out of the upper region of the transfer gearbox is collected in oil reservoir 33, and the predominant part of the lubrication oil flowing out of oil reservoir 33 through outlet opening 35 is conveyed by means of chain 25 back in the direction of the upper region of the transfer gearbox so that this part of the lubrication oil circulates in the transfer gearbox without reaching oil sump 31. As a result, there is a lower oil level in oil sump 31 than in oil reservoir 33. As a result, the churning losses are minimized, these being brought about by the constant immersion of the teeth of lower chain wheel 27 and the links carried by this of chain 25 into oil sump 31. Correspondingly, no significant heating of the lubrication oil occurs in oil sump 31 as a result of the stated churning losses. In any event, no churning losses are produced in upstream oil reservoir 33 since no gearbox components engage in oil reservoir 33. The transfer gearbox also has a high degree of efficiency since, as a result of the low oil level in oil sump 31, the drag torques in oil sump 31 are also reduced to a minimum.

Moreover, a structure with a minimal installation height can be produced for the transfer gearbox since the volume required to collect the lubrication oil is provided in oil reservoir 33, which can be arranged radially offset to lower chain wheel 27 and entire chain drive 21, as is apparent from FIG. 1.

A further advantage of the illustrated transfer gearbox lies in the fact that, despite the explained throttle action of chain 25 at outlet opening 35 of oil reservoir 33, in the event of a standstill of the transfer gearbox, a larger part of the lubrication oil can flow out of oil reservoir 33 into oil sump 31 than is the case during operation of the transfer gearbox. In the event of a standstill of the transfer gearbox, an oil level of the same height can thus arise in oil sump 31 and oil reservoir 33, or at least the oil level in oil sump 31 in the event of a standstill of the transfer gearbox is higher than during operation of the transfer gearbox. In the event of a subsequent starting up of the transfer gearbox, as a result of the large quantity of lubrication oil which is present in oil sump 31, a relatively high conveying rate is thus achieved, as a result of which it is ensured that the lubrication oil quickly reaches the various lubrication points in the required quantities (friction clutch, possibly bearings). Moreover, relatively high churning losses occur during the starting up of the transfer gearbox as a result of the high oil level in oil sump 31. These, however, contribute to the lubrication oil heating up quickly and the viscosity specified to the operating temperature being reached. In other words, the initially increased oil level in oil sump 31 contributes to the lubrication oil reaching the operating temperature particularly quickly and being able to perform the intended lubrication and cooling function.

LIST OF REFERENCE SIGNS

11 Housing half
13 Flange surface
15 Input shaft
17 First output shaft
19 Second output shaft
21 Chain drive
23 Upper chain wheel
25 Chain
27 Lower chain wheel
29 Chain conduit
31 Oil sump
33 Oil reservoir
35 Outlet opening
A Rotational axis of the lower chain wheel

What is claimed is:

1. A transfer gearbox for a motor vehicle, the transfer gearbox comprising:
    a housing;
    an input shaft rotatably mounted in the housing and formed in one piece with a first output shaft;
    a second output shaft rotatably mounted in the housing offset parallel to, and spatially below the input shaft and the first output shaft;
    a chain drive having a lower chain wheel rotationally coupled to the second output shaft, an upper chain wheel, and a chain to drive-connect the lower chain wheel and the upper chain wheel;
    an oil sump to receive lubricating oil which is to be engaged by the lower chain wheel such that, via the chain, the lubrication oil is conveyed from the oil sump in a direction of the upper chain wheel; and
    an oil reservoir to collect the lubrication oil conveyed by the chain, the oil reservoir having an outlet opening which opens into the oil sump, and which is arranged immediately adjacent to, and flush with the chain in order that the chain throttles an outflow out of the lubrication oil from the oil reservoir into the oil sump.

2. The transfer gearbox of claim 1, wherein the chain is arranged at the outlet opening of the oil reservoir in such a manner that the chain conveys at least a portion of the lubrication oil flowing out of the oil reservoir directly in a direction of the upper chain wheel.

3. The transfer gearbox of claim 1, further comprising a chain conduit to guide the chain spatially above the outlet opening of the oil reservoir and also spatially below the outlet opening of the oil reservoir.

4. The transfer gearbox of claim 1, further comprising a chain conduit to guide the chain spatially above the outlet opening of the oil reservoir.

5. The transfer gearbox of claim 1, further comprising a chain conduit to guide the chain spatially below the outlet opening of the oil reservoir.

6. The transfer gearbox of claim 1, wherein the outlet opening of the oil reservoir is arranged spatially above a floor of the oil sump.

7. The transfer gearbox of claim 1, wherein the oil reservoir is arranged radially offset to the oil sump in relation to the rotational axis of the lower chain wheel.

8. The transfer gearbox of claim 1, wherein the outlet opening of the oil reservoir lies opposite an outer circumferential side of the chain.

9. The transfer gearbox of claim 1, wherein the outlet opening of the oil reservoir lies opposite an outer circumferential side of the chain.

10. The transfer gearbox of claim 1, wherein the lubrication oil is guided exclusively via the oil reservoir into the oil sump.

11. A transfer gearbox for a motor vehicle, the transfer gearbox comprising:
    an input shaft;
    a first output shaft integrally formed with the input shaft;
    a second output shaft;
    a chain drive having a chain, a lower chain wheel, and an upper chain wheel which are drive-connected via the chain;
    an oil sump having lubricating oil, the oil sump to be engaged by the lower chain wheel such that the lubrication oil is conveyed via the chain from the oil sump in a direction of the upper chain wheel;
    an oil reservoir to collect the lubrication oil conveyed by the chain, the oil reservoir having an outlet opening which opens into the oil sump, and which is arranged immediately adjacent to, and flush with the chain in order that the chain throttles an outflow of the lubrication oil from the oil reservoir into the oil sump.

12. The transfer gearbox of claim 11, wherein the chain is arranged at the outlet opening of the oil reservoir in such a manner that the chain conveys at least a portion of the lubrication oil flowing out of the oil reservoir directly in a direction of the upper chain wheel.

13. The transfer gearbox of claim 11, further comprising a chain conduit configured to guide the chain spatially above the outlet opening of the oil reservoir.

14. The transfer gearbox of claim 13, wherein the chain conduit is also configured to guide the chain spatially below the outlet opening of the oil reservoir.

15. The transfer gearbox of claim 11, further comprising a chain conduit configured to guide the chain spatially below the outlet opening of the oil reservoir.

16. The transfer gearbox of claim 11, wherein the outlet opening of the oil reservoir is arranged spatially above a floor of the oil sump.

17. The transfer gearbox of claim 11, wherein the oil reservoir is arranged radially offset to the oil sump in relation to the rotational axis of the lower chain wheel.

18. The transfer gearbox of claim 11, wherein the outlet opening of the oil reservoir lies opposite an outer circumferential side of the chain.

19. The transfer gearbox of claim 11, wherein the lubrication oil is guided exclusively via the oil reservoir into the oil sump.

20. A motor vehicle, comprising:
    a transfer gearbox including:
        a housing;
        an input shaft rotatably mounted in the housing and formed in one piece with a first output shaft;
        a second output shaft rotatably mounted in the housing offset parallel to, and spatially below the input shaft and the first output shaft;
        a chain drive having a lower chain wheel rotationally coupled to the second output shaft, an upper chain wheel, and a chain to drive-connect the lower chain wheel and the upper chain wheel;
        an oil sump to receive lubricating oil which is to be engaged by the lower chain wheel such that, via the chain, the lubrication oil is conveyed from the oil sump in a direction of the upper chain wheel; and
        an oil reservoir to collect the lubrication oil conveyed by the chain, the oil reservoir having an outlet opening which opens into the oil sump, and which is arranged immediately adjacent to, and flush with the chain in order that the chain throttles an outflow of the lubrication oil from the oil reservoir into the oil sump.

* * * * *